United States Patent
Borseth

(10) Patent No.: US 7,531,144 B2
(45) Date of Patent: May 12, 2009

(54) SYSTEM FOR PRODUCTION OF FRESH WATER AND REMOVAL OF CARBON DIOXIDE FROM EXHAUST GASES

(75) Inventor: Knut Erik Borseth, Tarnasen (NO)

(73) Assignee: Sargas AS, Oslo (NO)

( * ) Notice: Subject to any disclaimer, the term of this patent is extended or adjusted under 35 U.S.C. 154(b) by 0 days.

(21) Appl. No.: 11/937,013

(22) Filed: Nov. 8, 2007

(65) Prior Publication Data

US 2008/0173588 A1     Jul. 24, 2008

Related U.S. Application Data

(63) Continuation of application No. 10/504,540, filed as application No. PCT/NO03/00059 on Dec. 14, 2003, now Pat. No. 7,309,440.

(30) Foreign Application Priority Data

Feb. 15, 2002    (NO)  .................................. 20020782

(51) Int. Cl.
*B01D 53/62*     (2006.01)
*C02F 1/58*      (2006.01)

(52) U.S. Cl. ........................... 422/176; 96/235; 96/268; 96/281; 210/177; 210/180; 210/181; 210/182; 210/202; 210/205; 210/251

(58) Field of Classification Search .................. 210/175; 422/173

See application file for complete search history.

(56) References Cited

U.S. PATENT DOCUMENTS 3,203,894 A     8/1965   Ikuno (Continued)

FOREIGN PATENT DOCUMENTS

WO     WO 01/96243 A1    12/2001

OTHER PUBLICATIONS

H.K. Abdel-Aal et al., Chemical Separation Process for Highly Saline Water. 1. Parametric Experimental Investigation. Ind. Eng. Chem. Res., 35: 799-804 (1996).
Norwegian Patent Office Official Letter issued in related Norwegian Application No. 20020782, 2 pgs., (Aug. 14, 2002).

(Continued)

*Primary Examiner*—Peter A Hruskoci
(74) *Attorney, Agent, or Firm*—Rothwell, Figg, Ernst & Manbeck, PC

(57) ABSTRACT

This invention relates to a method for desalination of seawater (5, 30) and separation of $CO_2$ from exhaust (77) from a gas turbine (7). LNG (4) is fed into a heat exchanger (6) in which it receives heat from seawater (5) and heat from steam (27) from an exhaust boiler, and heat from combustion air (3) via a line to an air inlet (33) of said gas turbine (7), for evaporating LNG (4) to gas which is fed to a gas export module (10) and to a fuel gas skid (8) for supplying said gas turbine (7) with fuel. Thus said combustion air (3, 28) at the air inlet to said gas turbine (7) obtains a lowered temperature and increases an efficiency of said gas turbine (7). Said $CO_2$-rich exhaust gas (77) from said gas turbine (7) is fed into a process unit (17) having an inlet (35*a*) with a fan (35*b*) and an outlet for $CO_2$-reduced exhaust (13). Said cooled seawater from said heat exchanger (6) is fed into said process unit (17) via a coaxial feed pipe (67) for seawater and $NH_4OH$ arranged in said process unit (17). $NH_4OH$ is fed into said coaxial feed pipe (67) and is then mixed with said cooled seawater (30) and released via a series of nozzles in several vertical levels from said feed pipe (67) to said process unit's (17) upwards flowing, rotating exhaust (77). By this device a good mixture of $NH_4OH$-containing salt water and $CO_2$-rich exhaust is achieved, for formation of $NaHCO_3$, $NH_4Cl$, and fresh water.

13 Claims, 4 Drawing Sheets

U.S. PATENT DOCUMENTS

| | | |
|---|---|---|
| 3,741,890 A | 6/1973 | Smith et al. |
| 3,861,891 A * | 1/1975 | Noguchi et al. ............... 96/281 |
| 3,927,838 A | 12/1975 | Soloviev et al. |
| 4,291,549 A | 9/1981 | Fujimura et al. |
| 5,084,187 A | 1/1992 | Wilensky |
| 5,360,554 A | 11/1994 | Sloan et al. |
| 5,614,102 A | 3/1997 | Sakurada |
| 6,180,012 B1 | 1/2001 | Rongved |
| 6,235,092 B1 | 5/2001 | Spencer |
| 6,720,359 B2 | 4/2004 | O'Rear et al. |
| 6,899,750 B2 * | 5/2005 | Hogan ......................... 96/240 |
| 7,037,434 B2 | 5/2006 | Myers et al. |
| 2006/0000355 A1 * | 1/2006 | Ogura et al. .................. 95/224 |

OTHER PUBLICATIONS

English Translation of Norwegian Patent Office Official Letter issued in related Norwegian Application No. 20020782, 2 pgs., (May 5, 2005).

Norwegian Search Report issued in related Norwegian Application No. 20020782, 1 pg., (Sep. 8, 2002).

* cited by examiner

SYSTEM FOR PRODUCTION OF FRESH WATER AND REMOVAL OF CARBON DIOXIDE FROM EXHAUST GASES

This application claims the benefit under 35 U.S.C. § 120 (e) of the filing date of patent application Ser. No. 10/504,540 filed Aug. 13, 2004, now U.S. Pat. No. 7,309,440, which is a national phase of PCT/NO03/00059 filed Feb. 14, 2003, which claims priority from Norwegian Patent Application No. 20020782 filed Feb. 15, 2002, the respective disclosures of which are incorporated herein by reference.

FIELD OF THE INVENTION

The invention relates to an improved process for removal of $CO_2$ from exhaust gases, in which huge amounts of seawater are transformed to fresh water by addition of ammonia $NH_3$ with subsequent precipitation of sodium hydrogen carbonate $NaHCO_3$ and ammonium chloride $NH_4Cl$. The process is made more efficient by using air, seawater and steam as heat sources during evaporation of liquefied natural gas (LNG). Cooled air is provided for the air inlet of a gas turbine, a feature that considerably improves the efficiency. Cooled seawater is used for removal of $CO_2$ from the exhaust gas from the gas turbine. This process is made more efficient by having a low seawater temperature; about 10° C. Steam is generated in the exhaust boiler of the gas turbine. The gas turbine generates electrical power for running the process that is necessary for evaporation of LNG. The excess electrical power is exported.

BACKGROUND OF THE INVENTION

Precipitation of $NaHCO_3$ and $NH_4Cl$ as described above is, in its basic principle, known as the Solvay soda process, which has been industrially dominating for a long time. Further we refer to U.S. Pat. No. 6,180,012 describing a closed tank in which enters $CO_2$-rich exhaust and seawater (with NaCl) and in which separately ammonia $NH_3$ is injected, and fresh water is formed. Sodium hydrogen carbonate $NaHCO_3$ and ammonium chloride $NH_4Cl$ precipitate to the bottom and are separated from seawater, which is transformed to fresh water.

It may be inefficient not to mix salt water and ammonia $NH_3$ before the injection into the chamber, as the process described in U.S. Pat. No. 6,180,012, because the components $NH_3$ and NaCl may not have sufficient time to be effectively mixed before further reaction with $CO_2$ in the exhaust gas. Further, it is a disadvantage of the U.S. Pat. No. 6,180,012 that the injection takes place only in a limited upper portion of the tank, and not a more thorough mixing, e.g. in a more extensive portion of the tank. It is a further disadvantage of the U.S. Pat. No. 6,180,012 that the process takes place with inlet of an exhaust gas to a closed tank, because the closed tank will form a counter pressure against the outlet from the gas turbine, and thus there is a risk of a considerable reduction of the gas turbine efficiency.

A typical gas turbine of 25 Megawatt (MW) generates an exhaust flow of about 3.3 kg/s of $CO_2$. That represents a large and undesirable production of $CO_2$ considering the probable contributions to greenhouse effects on the global atmosphere. Further, we expect that the unified process according to the invention also will prove commercially healthy because several countries may incur official $CO_2$-fees and/or trade $CO_2$ emission permissions, so-called "green certificates".

The process according to a preferred embodiment of the invention has its greatest potential in those parts of the world in which there is a lack of fresh water, e.g. in the Middle East, Western Africa, The Read Sea, etc. One of the main purposes of the invention is to contribute to the use of liquefied natural gas (LNG), seawater and ammonia for an electricity production of significantly reduced $CO_2$-emission, and evaporation of LNG simultaneously with soda production and fresh water production, in which all the products have a sales value. Considering that the invention also improves the efficiency of the electricity production from the gas turbine, by cooling the air to the gas turbine by means of LNG, the invention represents an essential improvement for efficient use of the Solvay process. Further, the process is dependent of low sea water temperature in order to achieve efficient removal of $CO_2$, about 10° C. There is a potential incompatibility in the facts that the seawater temperatures rarely are low in those coastal areas of the world in which there is a lack of fresh water for agricultural purposes or alternatively industrial purposes. Further, there is a potential incompatibility in the facts that evaporation of LNG requires a high seawater temperature, whereas the removal of $CO_2$ requires a low seawater temperature. The preferred embodiment of the present invention aims at combining these seemingly counteractive effects, thereby creating an improved process that should be commercially applicable and having a large market potential, particularly in those areas mentioned above.

An article called "Chemical Separation Process for Highly Saline Water, 1. Parametric Experimental Investigation" in Ind. Eng. Chem. Res., 1996, 35, 799-804, describes the separation of highly saline waters under various conditions and is carried out using a partial-desalting process. The method utilizes a series of chemical reactions involving conversion of Sodium Chloride, the major constituent in saline waters, into sodium bicarbonate, which precipitates under the experimental conditions, and ammonium chloride, which can be separated by crystallization. Experiments of absorption of carbon dioxide in an ammoniated brine have demonstrated the efficiency of the method.

SUMMARY OF THE INVENTION

The invention is a method for desalination of salt water, preferably seawater, and separation of $CO_2$ from a $CO_2$-rich exhaust gas from a fuel combustion engine or gas turbine, comprising the following steps:

LNG is fed into a heat exchanger in which heat is taken from seawater and heat from steam from a steam turbine, and heat from combustion air via a line to the air inlet to a gas turbine, for evaporating LNG to gas being fed to a gas export module and to a fuel gas skid for providing the gas turbine with fuel;

In which the combustion air, which at the air supply to the gas turbine thus has a lowered temperature, and thus increases the efficiency of the gas turbine;

In which $CO_2$-rich exhaust gas from the gas turbine is led into a chamber or process unit having an inlet with a fan and an outlet for $CO_2$-removed exhaust;

In which the cooled salt water from the heat exchanger is fed into the process unit via an upper swivel having vanes that rotates a coaxial feed pipe for seawater and $NH_4OH$, said coaxial pipe being arranged preferably in a centre line in said process unit;

In which $NH_4OH$ is fed in via a lower swivel of said insert coaxial pipe and mixed and released with the cooled salt water a series of nozzles at several vertical levels from the coaxial pipe to the upwards streaming and rotating exhaust through the process unit, in order to achieve a good mixture of $NH_4OH$-containing salt water and $CO_2$-rich exhaust, for formation of $NaHCO_3$, $NH_4Cl$, and $H_2O$.

The invention is also a process unit for removing $CO_2$ from an exhaust from a combustion engine or gas turbine, comprising the following features: an inlet with a fan and an outlet for exhaust of reduced $CO_2$ content; in which cooled salt water can be piped into said process unit via an upper swivel having vanes for rotating a coaxial pipe, said coaxial pipe for seawater and $NH_4OH$ feed, said coaxial feed pipe being arranged preferably in a centre line of said process unit; in which $NH_4OH$ can be guided in via a lower swivel on said coaxial pipe and mixed with said cooled salt water and released via a series of nozzles from said feed pipe, said nozzles arranged in several vertical levels, to upwardly flowing and rotating exhaust of said process unit; thus for achieving a mixture of $NH_4OH$-containing salt water and $CO_2$-rich exhaust for formation of $NaHCO_3$, $NH_4Cl$ and desalinated water.

DETAILED DESCRIPTION OF THE INVENTION

Figure 1:
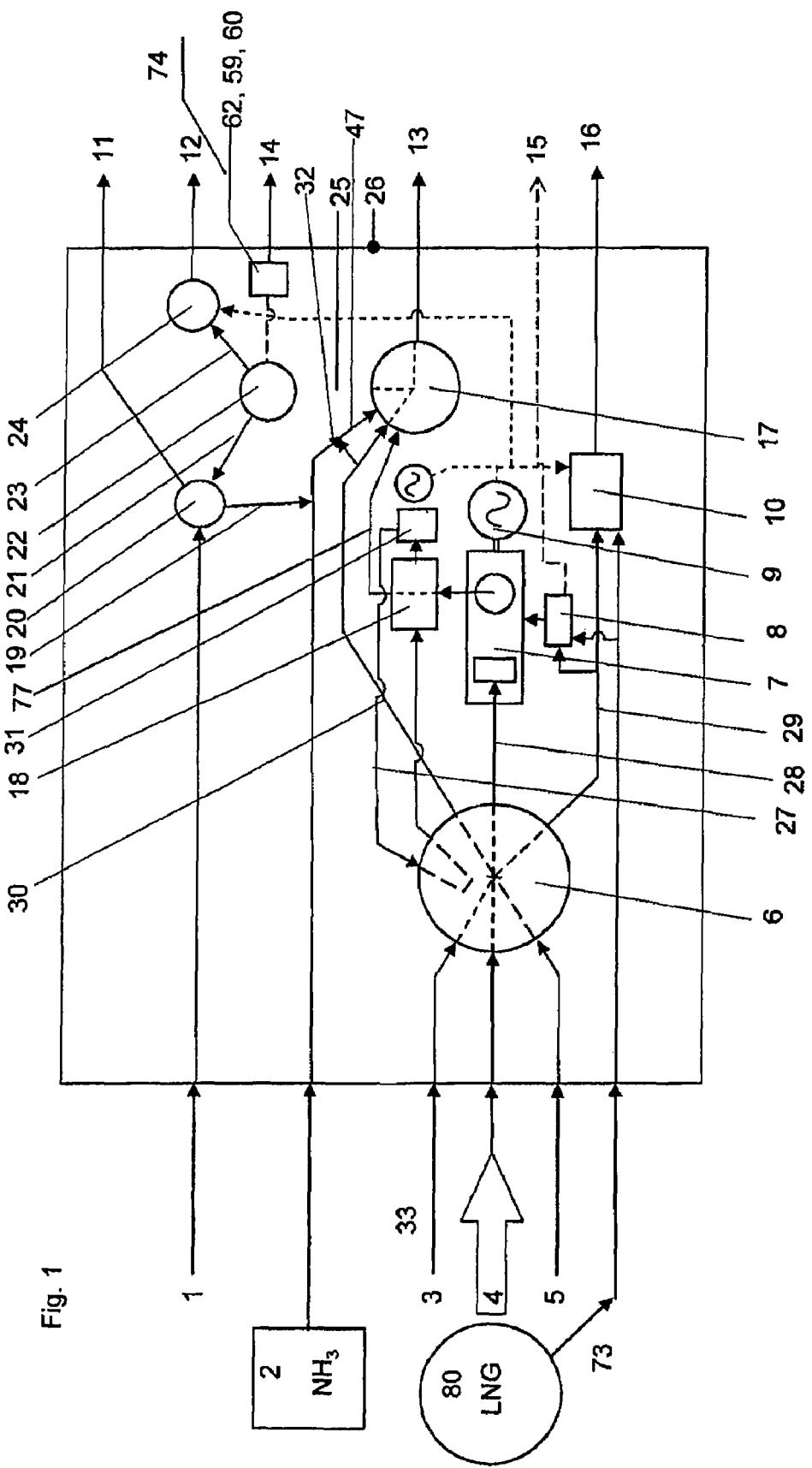
FIG. 1 illustrates a plan section of the terminal limits or process area, and illustrates in-flowing fluids and dry matter to the process from the left side in the drawing, with products from the products at the right side in the drawing.

Attached are figure drawings made for illustrating a preferred embodiment of the invention. However, the figure drawings are not meant for being construed as limiting to the invention, which shall be limited by the attached claims only.

In the drawing figures a partially converted petroleum oil tanker is used as the process unit. It is not a condition of the invention that such converted tankers are used, but second hand tankers are cheap and entirely useful under protected conditions, e.g. in an import harbour for LNG for which one requirement may be a protected harbour.

FIG. 1 illustrates a plan section of the terminal limits or process area 26, and illustrates in-flowing fluids and dry matter to the process from the left side in the drawing, with products from the products at the right side in the drawing. From the left side are illustrated in-flowing fluids and dry components as follows: Chalk $Ca(OH)_2$ (1) is sent to the process unit for regenerating of ammonia $NH_3$ (19), which will be explained below. Ammonia (2) is sent to a mixing unit for seawater and ammonia, for formation of $NH_4OH$ for injection via an insert feed pipe (67) to a process unit (17) for removal of $CO_2$ from exhaust gas (77) from a gas turbine (7), resulting in release of cleaned exhaust gas (13) to the atmosphere. Central for the preparation to the process is one or more heat exchangers (6). Combustion air of ambient temperature, e.g. 20-35° C., is led into the heat exchanger. Liquefied natural gas (LNG) (4) from an LNG-storage tank (80) outside of the system, is piped into the heat exchanger (6) while having a temperature of about −163° C. LNG (4) receives heat from the combustion air (3), and from seawater (5) and from steam from the exhaust gas steam boiler (18), steam of which is also piped through the heat exchanger. The paths of those fluids through the heat exchanger are better illustrated in FIG. 1. Boil-off gas (73) from the storage tank (80) may also be guided in through the heat exchanger if heating is needed before it is fed into the gas skid module (8) to constitute fuel for the gas turbine (7). Possible excess boil-off gas (73) may be fed into a line (29) to a gas export module (10).

The heat exchanger (6) is arranged before the gas turbine (7) and the process unit (17) constituting an exhaust process tower (17) for adsorbing $CO_2$ from the exhaust, leading further to a precipitation process unit for fresh water at the right side of the drawing.

The process is, according to a preferred embodiment, a method for desalination of salt water (5), which may be seawater or brackish water, with separation of $CO_2$ from a $CO_2$-rich exhaust (77) from a combustion engine, boiler or gas turbine (7). The process comprises the following steps:

LNG (4) is fed into the heat exchanger (6) in which it receives heat from the seawater (5) and heat from steam (27) from a steam turbine (31), and also heat from combustion air (3) sent via a line (28) to the air inlet (33) to the gas turbine (7). LNG (4) will then receive heat and evaporate to gas (29) that is led to a gas export module (10) and to a fuel gas skid (8) for providing the gas turbine (7) with fuel. The combustion air (28) at the air inlet (33) to the gas turbine (7) thereby is lowered in temperature out of the heat exchanger due to being cooled down by LNG (4), and thus increases the efficiency of the gas turbine (7).

Figure 2:
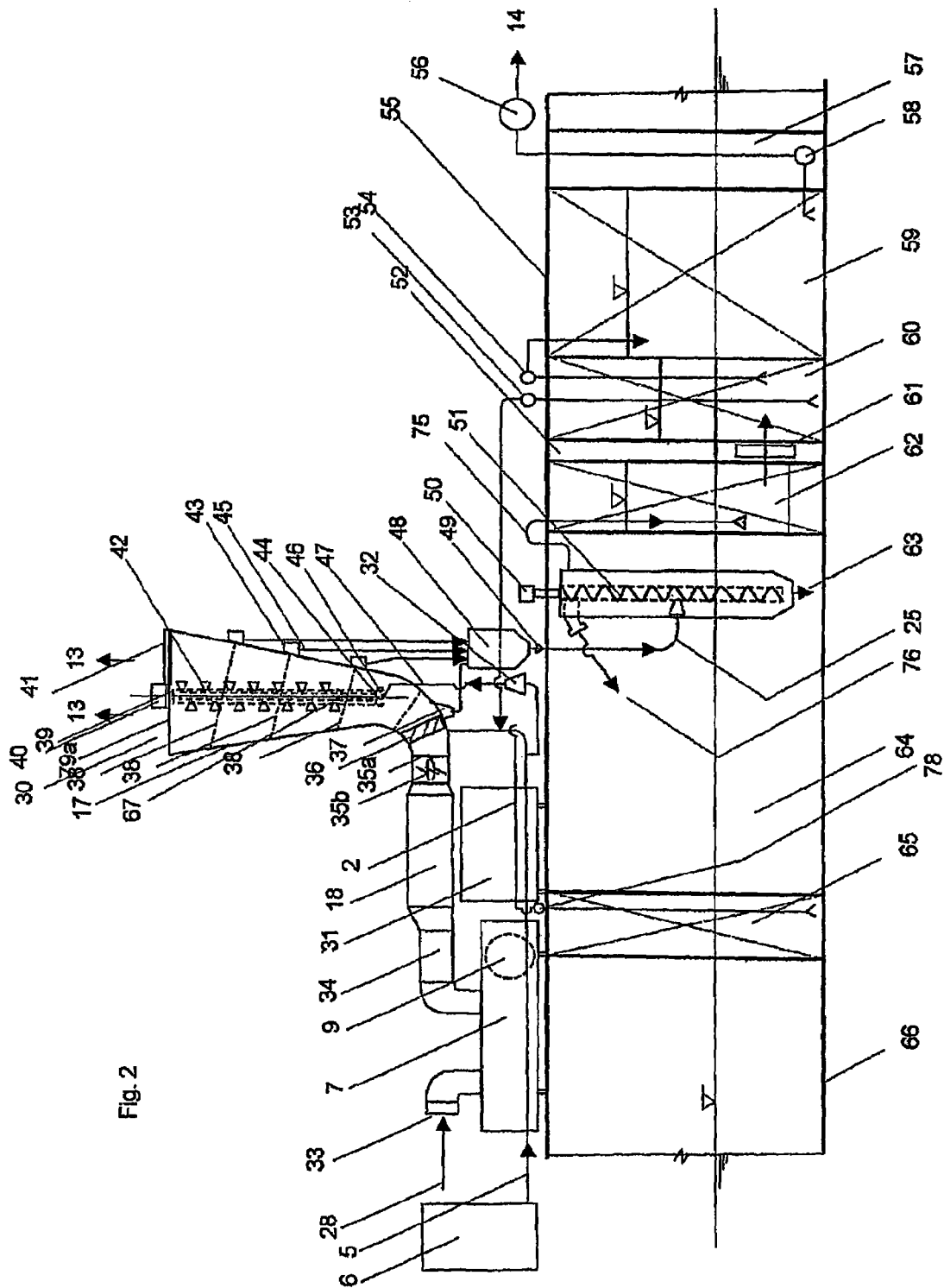
FIG. 2 illustrates a side view of an embodiment of the invention, here shown mounted upon a ship hull. The process tower and the separation unit for fresh water are shown below the deck.
Figure 4:
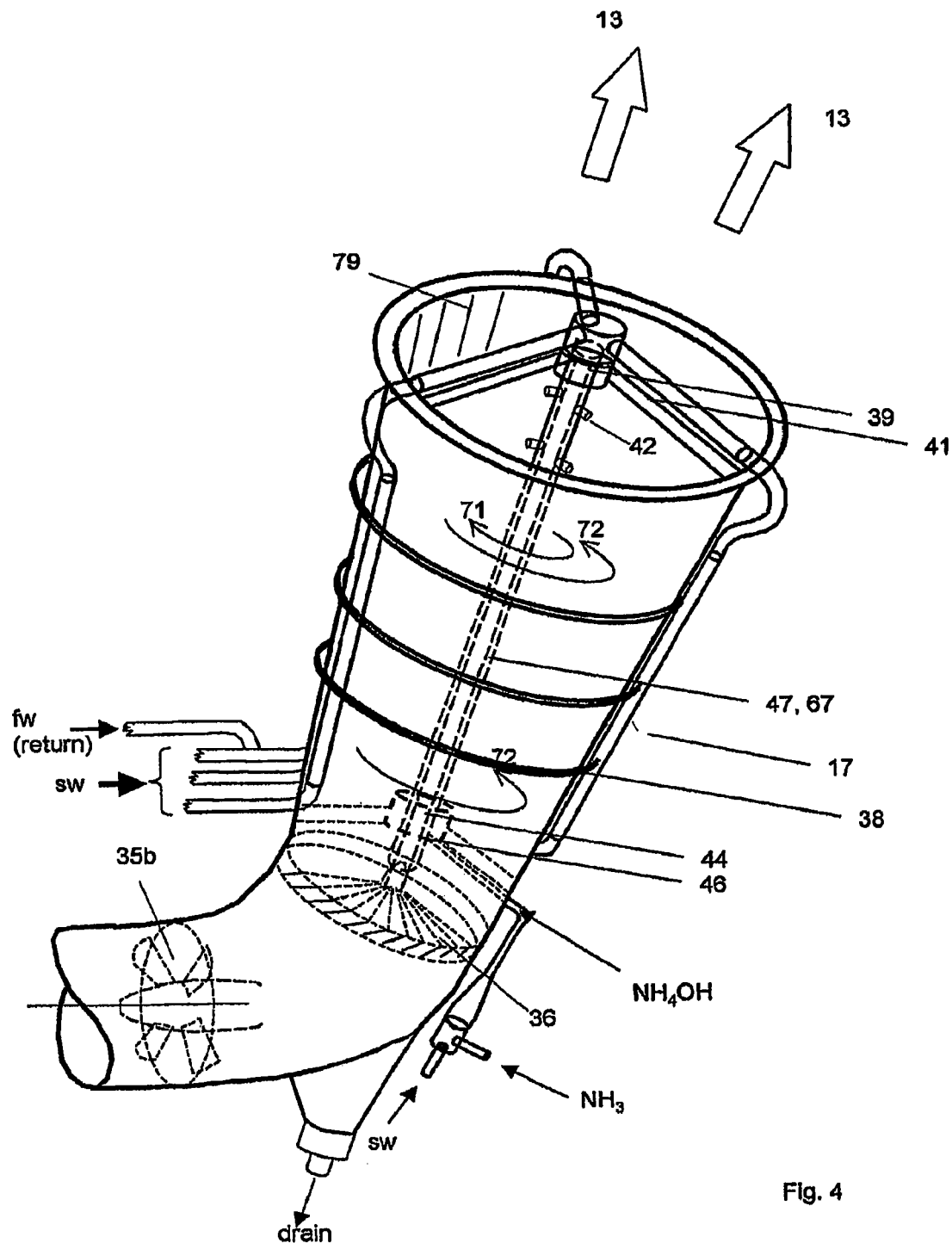
FIG. 4 is a perspective view as seen from above of an embodiment of the invention of the process tower between the fan inlet and up to the outlet of the $CO_2$ lean exhaust.

Referring to FIGS. 2 and 4, $CO_2$-rich exhaust gas (77) from the gas turbine (7) is led into a chamber rather called a process unit (17) having an inlet (35a) provided with a fan (35b) in the lower portion of the process unit (17), and an outlet (74) for $CO_2$-removed exhaust (13) at the upper end of the process unit (17).

Figure 3:
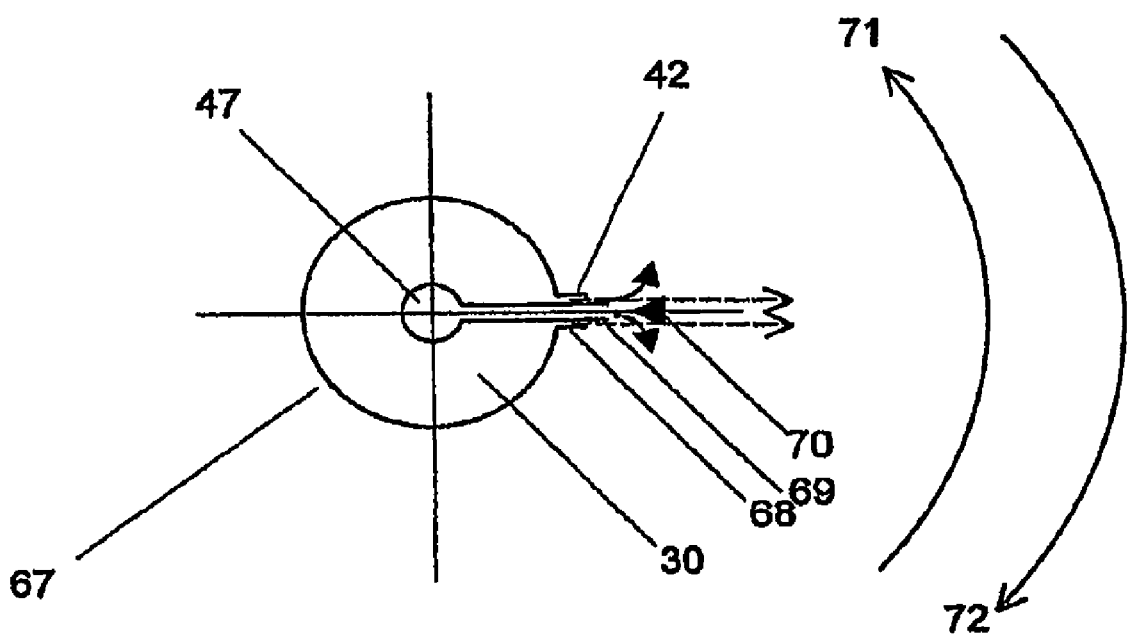
FIG. 3 is a horizontal view of a rotating swivel for sea water and $NH_4OH$ which in an embodiment of the invention is mounted standing in the middle of the process tower for the separation of CO2 from the exhaust.

The cooled salt water (30) from the heat exchanger (6) is fed into the process unit (17) via an upper swivel (40) having vanes that rotate an insert coaxial pipe (67) for seawater and $NH_4OH$ in a desired direction (71) being opposite of the desired rotation direction (72) (See FIGS. 3 and 4) for the exhaust gas, and preferably being arranged along the centre line inside the process unit (17). This increases the degree of mixing between the seawater mixture and the exhaust gas considerably compared to the U.S. Pat. No. 6,180,012.

$NH_4OH$ is led in through a lower swivel (46) on the coaxial pipe (67) (See FIGS. 2 and 4). $NH_4OH$ is mixed with the cooled salt water (30) and flushed out into the process unit (17) via a series of radially directed nozzles (42) at several vertical levels from the coaxial pipe (67) to the upwardly flowing, rotating exhaust (77) through the process unit (17). As the exhaust (77) is reduced in $CO_2$ during the continuous chemical process, we name it $CO_2$-lean exhaust (13). By means of the rotating nozzles and the oppositely rotating exhaust, a good mixing of $NH_4OH$-rich salt water and $CO_2$-rich exhaust (77) is achieved, for formation of $NaHCO_3$, $NH_4Cl$, and $H_2O$.

According to a preferred embodiment of the invention the process unit (17) has a diameter increasing with increased elevation from the lower inlet (35a) to the upper outlet (74). As shown in FIGS. 2 and 4, drain gutters (38) to drains (43) are arranged, leading to outlets (45) to a collecting tank (48) for $NaHCO_3$, $NH_4Cl$, and fresh water.

According to a preferred embodiment of the invention, which differs essentially from the mentioned U.S. Pat. No. 6,180,012 is an exhaust fan (35B) forcing forward the exhaust (77) and thus reduces the counter pressure for the gas turbine (7) so as to compensate the pressure drop through the process unit (17) in order to maintain the efficiency of the gas turbine. The exhaust fan (35B) initiates at the same time a rotation of the exhaust gas (77), further reinforced by means of fixed guide vanes (36) arranged downstream at the inlet (35a) of the process unit (17).

According to the preferred embodiment of the invention as shown in FIGS. 2 and 4, $NH_4OH$ enters through the lower swivel (46) to a central, coaxial inner pipe (47) in the coaxial feed pipe (67) in the process unit (17). The inner pipe (47) is surrounded by a mantle of salt water (30) through which $NH_4OH$ is led out through pipes to sea water ring nozzles (42) in the feed pipe (67). In the nozzles (42) $NH_4OH$ and seawater are mixed through flushing from the nozzles to the $CO_2$-rich exhaust (77) gradually being changed to $CO_2$-lean exhaust (13) on its way upward through the process unit (17). The nozzles are preferably provided with $NH_4OH$-radial distributors (70) arranged just outside the nozzles (42) in order for $NH_4OH$ to be forced out through an enveloping flow of the mixed cooled seawater (30). This implies two essential advantages relative to U.S. Pat. No. 6,180,012 in that ready-mixed droplets of $NH_4OH$ are flushed out towards the NaCl-molecules and contribute to weaken the molecular binding between Na and Cl, thus facilitating formation of $NaHCO_3$ as one of the end products.

Precipitated material of $NaHCO_3$, $NH_4Cl$ intermediately dissolved in $H_2O$ are conducted to a precipitator (22) for separation of $NaHCO_3$ and $NH_4Cl$ from the water $H_2O$ which is generally pure fresh water if the process is thoroughly controlled and low temperature of the seawater is maintained.

According to a preferred embodiment of the invention the precipitator (22) is vertically standing and cylindrical, and has a rotation-inducing tangential inlet (25B) for $NaHCO_2$/$NH_4Cl$ dissolved in water. The driving pressure is generated from the pressure head from the collector tank (48) to the inlet (25B). $NaHCO_2$/$NH_4Cl$ is precipitated by the rotation and the gravitation towards the bottom of the precipitator (22).

According to a preferred embodiment of the invention fresh water (74) is taken out through a fresh water overflow pipe (75) to a fresh water filter tank (62). The fresh water (74) from the filter tank (62) is sent through a filter (61) to a distribution- and settling tank (60). Salt water may be present at the bottom of the settling tank (60), of which salt water may be lifted back to the seawater pipe (30) by means of the pump (53). Fresh water (74) is pumped by means of the pump (54) to storage tank (59), and further from storage tank (59) via discharge pump (58) and booster pump/export pump (56) to an export pipeline (14).

The precipitated $NH_4Cl$ and $NaHCO_3$ is lifted by means of a screw pump or "Archimedes screw" (51) that is driven by a motor (50), to an outlet (76) from the precipitator (22) to a refining process compartment (64). Chalk $Ca(OH)_2$ (1) is led into the process unit (20) for regeneration of ammonia $NH_3$ that is fed via a pipe (19) to be mixed with additional $NH_3$ (2) from the ammonia tank (65). The ammonia (2, 19) is led further to the mixing unit (32) mixing salt water and ammonia (2, 19) and pumps the mixture $NH_4OH$ into the feed pipe (67) in the process unit (17).

According to a preferred embodiment of the invention, the gas turbine (7) drives a generator (9) for generating electrical energy that partially may be exported as energy (15), and partially to be used for pumping work, gas and/or $CO_2$ export work, and heating a process unit (24) that precipitates soda/$Na_2CO_3$ (12) for export, and $CO_2$ and fresh water, which are exported or returned to the process.

Components List.
1 $Ca(OH)_2$—limestone
2 $NH_3$—ammonia
3 combustion air to gas turbine(s), e.g. 20° C. before the heat exchanger, and after the heat exchanger in to the gas turbine holding 5° C.
4 liquefied natural gas (LNG), −163° C., (1.2 mill. tons/year.
5 seawater—250 000 m3/day, e.g. 15° C. in to the heat exchanger, and about 5° C. out from the heat exchanger, and further to the rotating feed pipe (67)
6 heat exchanger, (possibly several in parallel).
7 gas turbine(s), (120 MW)
8 gas skid module, for treating gas supply to the gas turbine, (pressurizing, drying and filtering)
9 generator
10 gas export module (needs 25 MW power to deliver 131 MSC FTD (Mill. Standard Cubic Ft./day (evaporated) LNG/year)
11 $CaCl_2$—drying agent
12 $Na_2CO_3$—soda
13 exhaust out of the process, low in $CO_2$—contents
14 fresh water about 250000 $m^3$/day
15 electrical energy for export.
16 gas export from the gas export gas export module 10
17 process unit, for adsorption of $CO_2$ from exhaust
18 exhaust boiler from turbine 7 for generating steam
19 regenerated $NH_3$—ammonia
20 process unit for regenerating $NH_3$
21 ammonium chloride solution $NH_4Cl$
22 process unit for precipitation of sodium hydrogen carbonate $NaHCO_3$ and ammonium chloride $NH_4Cl$ from water
23 sodium hydrogen carbonate $NaHCO_3$
24 process unit for precipitation of soda $Na_2CO_3$.
25 $NaHCO_3$ and $NH_4Cl$—solution pipe
25B tangential inlet to process unit (22) for precipitation
26 terminal border (extent of the area)
27 steam to heat exchanger (condenser)
28 combustion air to gas turbine (see (3)), about 5° C.
29 gas to gas export module 10 and to fuel gas skid 8
30 seawater to process unit, cooled to about 5° C. out from heat exchanger 6
31 steam turbine
32 mixer for seawater and ammonia $NH_3$
33 air inlet to gas turbine
34 muffler (sound attenuator) out from gas turbine
35A inlet to process unit (17) from exhaust fan (35b)
35B exhaust fan
36 exhaust lead vanes for reinforcing rotation of exhaust gas (77) of high $CO_2$—contents
37 drain at lower portion of the process unit (17)
38 guide gutter to drain (43)
39 horizontal and vertical bearing for the rotating coaxial pipe (67)
40 swivel for injection of cooled sea water (30), with guide vanes for rotating the insert feed pipe (67)41 support beams (3 ex) for the feed pipe (67)
41 support beams (3 ex) for the coaxial pipe (67)
42 nozzles for $NH_4OH$ and seawater
43 drain from guide gutter (38)
44 horizontal bearing for the rotating feed pipe (67)
45 drop line from the drain (43) to the collector tank (48) for $NaHCO_3$ and $NH_4Cl$—solution
46 swivel for $NH_4OH$ solution
47 supply line for $NH_4OH$ to swivel (46) with rotating coaxial pipe (67) with nozzles (42)
48 collecting tank for $NaHCO_3$ and $NH_4Cl$—solution (25)

49 choke valve at outlet form collector tank (48)
50 motor for screw (Archimedes screw) on lift pump (51)
51 screw lift pump
52 cofferdam between tanks
53 lift pump for salt-containing water from bottom portion of the distribution/settling tank (60).
54 lift pump for fresh water from distribution/settling tank (60) to fresh water storage tank (59)
55 main deck of (converted) crude oil tanker
56 export booster pump (s) for fresh water
57 pump compartment
58 discharge pump, pressure support to export pump (56)
59 fresh water storage tank
60 distribution tank/settling tank
61 filter between filter tank (62) and distribution/settling tank (60)
62 filter tank
63 drain from precipitation process unit (22)
64 process compartment for precipitated material 76
65 tank for $NH_3$ ammonia
66 bottom of (converted) crude oil tanker
67 rotating coaxial feed pipe for $NH_4OH$ and seawater
68 ring nozzle for sea water (30) in rotating coaxial pipe (67)
69 nozzles for $NH_4OH$ on pipe from coaxial supply line (47) in the rotating coaxial pipe (67) in the process unit (17)
70 radial distributor for $NH_4OH$ outside of the nozzle (69)
71 rotation direction for the coaxial pipe (67)
72 rotation direction for the exhaust (77)
73 boil-off gas from LNG storage tank
74 fresh water from the distribution/settling tank (60)
75 overflow pipe for water from the separation/process unit (22)
76 outlet of precipitated material sodium hydrogen carbonate $NaHCO_3$ and ammonium chloride $NH_4Cl$
77 exhaust having a high $CO_2$—content, in to the process unit (17) from the gas turbine (7)
78 lift pump from the tank (65) which delivers to the mixer (32)
79 turbulence attenuating ribs
79A outlet for exhaust removed of CO2
80 LNG storage tank outside the process plant

What is claimed is:

1. A system for the reduction of $CO_2$ levels in an exhaust gas resulting from gas combustion in a combustion unit, said system comprising:
one or more heat exchangers arranged for the transferral of heat energy from salt water and combustion air to liquefied natural gas to form cooled salt water and to evaporate said liquefied natural gas to fuel gas;
means for mixing said fuel gas with said combustion air for gas combustion which generates exhaust gas containing $CO_2$; and
a process unit to which, subsequent to the gas combustion, the exhaust gas is furnished, and which is constructed and arranged to mix $NH_4OH$ with said cooled salt water to form cooled $NH_4OH$ comprising salt water;
wherein said process unit is configured to cause said cooled $NH_4OH$ comprising salt water to contact said exhaust gas, such that at least a portion of the $CO_2$ contained in said exhaust gas reacts with the cooled $NH_4OH$ comprising salt water such that the $CO_2$ level is reduced in said exhaust gas which is output from said process unit, and further configured to cause formation of a mix of process unit products $NaHCO_3$, $NH_4Cl$ and fresh water, said process unit comprising a first outlet for said exhaust gas with said reduced $CO_2$ level and a second outlet for said mix of process unit products.

2. The system according to claim 1, further including means for providing steam from a steam turbine to said one or more heat exchangers.

3. The system according to claim 1 wherein said process unit comprises a contacting chamber including an upper swivel having vanes for rotating a coaxial feed pipe adapted for distribution of said salt water and $NH_4OH$.

4. The system according to claim 3, wherein said process unit contacting chamber has an increasing diameter with increasing elevation from a lower inlet to an upper outlet.

5. The system according to claim 3 wherein said coaxial feed pipe is arranged mainly in a centre line of said process unit.

6. The system according to claim 3 wherein said process unit is configured to receive said cooled salt water at said upper swivel.

7. The system according to claim 6 wherein said coaxial feed pipe is provided with a lower swivel through which $NH_4OH$ is provided.

8. The system according to claim 7, wherein said coaxial feed pipe comprises:
an inner pipe to which $NH_4OH$ is furnished, said inner pipe being arranged to be enveloped by a mantle of cooled salt water; and
salt water ring nozzles,
wherein said salt water ring nozzles are arranged for mixing of $NH_4OH$ carried by pipes to said salt water ring nozzles and said cooled salt water in said nozzles during flushing of said $NH_4OH$ and said cooled $NH_4OH$ comprising salt water into said contacting chamber.

9. The system according to claim 8 wherein said salt water ring nozzles are arranged on said coaxial feed pipe in a plurality of vertical levels.

10. The system according to claim 3 wherein said process unit comprises a fan arranged for initiating a rotational movement of said exhaust gas prior to said exhaust gas being furnished to said process unit.

11. The system according to claim 10 wherein guiding vanes are arranged after said fan, but prior to injection into said contacting chamber, wherein said guiding vanes are arranged for reinforcing said rotational movement of said exhaust gas.

12. The system according to claims 10 wherein said coaxial feed pipe is arranged for rotating in an opposite direction to the rotational movement of said exhaust gas.

13. The system according to claim 1, wherein said second outlet of said process unit comprises draining guide gutters to drains leading to said second outlet and further to a collector tank for said process unit's products $NaHCO_3$, $NH_4Cl$ and fresh water.

* * * * *

UNITED STATES PATENT AND TRADEMARK OFFICE
CERTIFICATE OF CORRECTION

PATENT NO. : 7,531,144 B2  Page 1 of 1
APPLICATION NO. : 11/937013
DATED : May 12, 2009
INVENTOR(S) : K. E. Borseth It is certified that error appears in the above-identified patent and that said Letters Patent is hereby corrected as shown below:

On Coversheet item [63]:

Under "Related U.S. Application Data" section, please change "Dec. 14, 2003" to "Feb. 14, 2003".

Signed and Sealed this

Twenty-eighth Day of July, 2009

JOHN DOLL
*Acting Director of the United States Patent and Trademark Office*